(12) United States Patent
Yalamanchili et al.

(10) Patent No.: US 8,215,850 B2
(45) Date of Patent: Jul. 10, 2012

(54) OPTICAL MODULE WITH FIBER FEEDTHROUGH

(76) Inventors: Prasad Yalamanchili, Santa Clara, CA (US); Xiangdong Qiu, Cupertino, CA (US); Reddy Raju, Fremont, CA (US); Jihua Du, Santa Clara, CA (US)

( * ) Notice: Subject to any disclaimer, the term of this patent is extended or adjusted under 35 U.S.C. 154(b) by 273 days.

(21) Appl. No.: 12/648,580

(22) Filed: Dec. 29, 2009

(65) Prior Publication Data

US 2011/0158594 A1    Jun. 30, 2011

(51) Int. Cl.
*G02B 6/36* (2006.01)
*G02B 6/42* (2006.01)

(52) U.S. Cl. .............. 385/94; 385/92; 385/138

(58) Field of Classification Search .................. None
See application file for complete search history.

(56) References Cited

U.S. PATENT DOCUMENTS

| | | | | |
|---|---|---|---|---|
| 4,707,065 A | | 11/1987 | Jenkins ................ | 385/138 |
| 4,902,091 A | * | 2/1990 | Althaus et al. ........... | 385/138 |
| 4,904,046 A | | 2/1990 | Paschke et al. ........... | 385/138 |
| 4,921,322 A | * | 5/1990 | Seike et al. .............. | 385/138 |
| 5,177,806 A | | 1/1993 | Abbott et al. ............. | 385/76 |
| 5,430,257 A | * | 7/1995 | Lau et al. ................. | 174/151 |
| 5,509,952 A | | 4/1996 | Moore et al. ............. | 65/406 |
| 5,515,473 A | * | 5/1996 | Yamauchi et al. ........ | 385/138 |
| 5,613,031 A | | 3/1997 | Tanabe et al. ............ | 385/138 |
| 5,658,364 A | | 8/1997 | DeVore et al. ........... | 65/431 |
| 5,815,619 A | | 9/1998 | Bloom ..................... | 385/78 |
| 5,970,194 A | | 10/1999 | Dunn et al. .............. | 385/95 |
| 6,220,766 B1 | | 4/2001 | Yeandle et al. ........... | 385/94 |
| 6,643,446 B2 | | 11/2003 | Moidu et al. ............. | 385/138 |
| 6,837,075 B1 | | 1/2005 | Snowdon et al. ......... | 65/406 |
| 6,901,203 B1 | | 5/2005 | Czubarow et al. ........ | 385/138 |
| 6,922,518 B2 | | 7/2005 | Esposito .................. | 385/138 |
| 2006/0284294 A1 | * | 12/2006 | Sherrer et al. ............ | 257/678 |

* cited by examiner

*Primary Examiner* — Mike Stahl
(74) *Attorney, Agent, or Firm* — Matthew A. Pequignot; Pequignot + Myers LLC

(57) ABSTRACT

A molded ceramic or glass ferrule has at least one longitudinal passage, which enables an optical fiber feed through, sealed into a metal housing with glass solder. The metal material in the housing has a slightly higher coefficient of thermal expansion (CTE) than the ferrule material and the sealing glass so that hermetic seal is maintained by a compression stress applied to the ferrule and sealing glass by the housing at operating conditions. When the housing has to be fabricated from a low CTE material, e.g. metal or ceramic, a metal sleeve and stress relief bracket is used to apply the compression stress.

26 Claims, 10 Drawing Sheets

OPTICAL MODULE WITH FIBER FEEDTHROUGH

CROSS-REFERENCE TO RELATED APPLICATIONS

The present invention claims does not claim priority.

TECHNICAL FIELD

The present invention relates to optical fiber feed-throughs, and in particular to fiber-coupled module packages that require hermetic sealing of a fiber to the package; however, the invention could be extended to other applications that utilize hermetic sealing to metal or ceramic packages.

BACKGROUND OF THE INVENTION

Conventional optical fiber feedthrough designs utilize a metal tube brazed, i.e. soldered with a nonferrous alloy having a lower melting point than the metals being joined, to a housing wall with an optical fiber extending therethrough and soldered in the metal tube. Unfortunately, it is expensive to create a high quality bore through the metal tube with tight tolerances that closely match the optical fiber extending therethrough. Accordingly, most metal tubes have large inner diameters (ID), and require a solder, i.e. either metal or glass, to fill the gap around the optical fiber to create a hermetic seal. Unfortunately, metal and glass solders form a high compression force seal, which can cause damage or even breakage in the optical fibers.

At present, a single-mode fiber (SMF) coupled laser diode pump module 1, illustrated in FIG. 1, includes a housing 2, which utilizes a metal, e.g. Copper Tungsten (CuW), base 3 with a coefficient of thermal expansion (CTE) closely matched to a metal wall 4, e.g. Kovar, to enclose optical and electrical equipment 5. A metal tube 6 is then brazed to the housing wall 4 with an inner diameter much larger than the optical fiber 7 that will be inserted through the metal tube 6. To create a hermetic seal, the gap between the optical fiber 7 and the metal tube 6 is filled with high-melting-point solder 8, e.g. glass or metal, that flows around the optical fiber 7, which may be metalized. Metalization adds cost and the high-temperature-solder process may weaken the optical fiber 7 as well as add stress to the optical fiber 7 upon cooling, which can degrade optical-electrical performance of the module 1.

U.S. Pat. No. 4,707,065, entitled Optical Fibre Sealing Assembly, issued Nov. 17, 1987 to Peter Jenkins discloses a metallic ferrule held in a bulkhead using an externally threaded retaining member with a sealing ring therebetween.

U.S. Pat. Nos. 4,904,046, entitled Process of and Apparatus for Leading an Optical Waveguide Through a Wall Via a Hermetic Seal, issued Feb. 27, 1990 to Paschke et al; 5,177,806, entitled Optical Fiber Feedthrough issued Jan. 5, 1993 to Abbott et al; 5,509,952, entitled Method for Bonding a Fiber to a Sleeve for Fiber Optic Packaging Applications issued Apr. 23, 1996 to Moore et al; 5,613,031, entitled Hermetically Sealed Optical Fiber Insert Structure issued Mar. 18, 1997 to Tanabe et al; 5,658,364, entitled Method of Making Fiber Optic-To-Metal Connection Seal, issued Aug. 19, 1997 to DeVore et al; 5,970,194 entitled Optical Fiber Having Hermetically Sealable Section, issued Oct. 19, 1999 to Dunn et al; 6,837,075, entitled Glass Fiber Fixative and Fixing Process, issued Jan. 4, 2005 to Snowdon et al; 6,901,203, entitled Fiber Optic Feed-Through Tube and Method for Making the Same, issued May 31, 2005 to Czubarow et al; and 6,922,518, entitled Method and Apparatus for Sealed Fiber Optic Feedthroughs issued Jul. 26, 2005 to Gerard Esposito each disclose the use of a metallic ferrule welded or metallically soldered to the outer wall of a housing with a glass solder sealing the fiber into the metallic ferrule.

U.S. Pat. No. 5,815,619, entitled Fiber Optic Connector Hermetically Terminated, issued Sep. 29, 1998 to Cary Bloom discloses an optical fiber sealed within a ferrule using molten metal.

U.S. Pat. No. 6,220,766, entitled Hermetically Sealed Package and Method of Assembly, issued Apr. 24, 2001 to Yeandle et al discloses a metal ferrule welded to a metal housing.

U.S. Pat. No. 6,643,446, entitled Hermetic Fiber Ferrule and Feedthrough, issued Nov. 4, 2003 to Moidu, Abdul Jaleel K. and Moore, William Thomas discloses a pair of glass sleeves within a outer metal sleeve, which is abutted against and welded to the housing of a module. A glass solder seals the fiber to the glass sleeves and the glass sleeves to the outer metal sleeve, and the end of the outer metal sleeve is fixed to the face of the module housing.

An object of the present invention is to overcome the shortcomings of the prior art by eliminating the use of metal solder around the ferrule and glass solder around the optical fiber by providing a ceramic ferrule that can be glass soldered to the housing, and which has an inner diameter closely matching the fiber OD so that an epoxy can be used to fill the gap and create a hermetic seal. Epoxy has advantages over solder, which require high temperature and introduce stress upon cooling that may weaken the fiber or lead to a reduction in the polarization extinction ratio of the optical signal.

SUMMARY OF THE INVENTION

Accordingly, the present invention relates to an optical module comprising:

an optical component for generating optical signals;

a housing for enclosing the optical component, the housing having a section with a first coefficient of thermal expansion (CTE) and including an opening extending through an outer wall thereof;

a ceramic ferrule, extending through the opening in the section of the housing with a gap therebetween, having a second CTE less than the first CTE, and including a longitudinally extending passage with an inside diameter (ID);

a glass solder, filling the gap between the ferrule and the section of the housing, and being under compression by the section of the housing due to the difference in the first and second CTE forming a hermetic seal therebetween;

an optical fiber, extending through the ferrule into alignment with the optical component, having an outside diameter up to 50 μm less than the inside diameter of the longitudinally extending passage; and an adhesive hermetically sealing the optical fiber in the longitudinally extending passage.

Another aspect of the present invention relates to a method of forming a feedthrough in a optical module including a housing with a section having a first coefficient of thermal expansion (CTE), comprising:

a) providing a ceramic ferrule having a longitudinally extending passage with an inside diameter (ID), the ceramic ferrule having a second CTE less than the first CTE;

b) hermetically sealing an optical fiber extending through the ferrule with an adhesive, the optical fiber having an outside diameter (OD) up to 50 μm less than the ID of the ferrule;

c) extending the ferrule through an opening in the section of the housing with a gap therebetween; and d) melting a glass solder at an elevated temperature in the gap to secure the ferrule in the opening;

whereby at operating temperatures the housing compresses the glass solder forming a hermetic seal, due to the difference in the first and second CTEs.

Another feature of the present invention provides an optical module comprising:

an optical component for generating optical signals;

a housing for enclosing the optical component, and including an opening extending through an outer wall thereof;

a ceramic ferrule, extending through the opening in the housing, having a first CTE and including a longitudinally extending passage with an inside diameter (ID);

a mounting sleeve for receiving the ceramic ferrule through an opening therein with a gap therebetween, having a second CTE greater than the first CTE;

a glass solder filling the gap between the ferrule and the mounting sleeve under compression by the mounting sleeve due to the difference in the first and second CTE forming a hermetic seal therebetween;

a stress-relief bracket extending between the mounting sleeve and the housing without direct connection to the ferrule or the glass solder;

an optical fiber, extending through the ferrule into alignment with the optical component, having an outside diameter up to 50 µm less than the inside diameter of the longitudinally extending passage; and an adhesive hermetically sealing the optical fiber in the longitudinally extending passage.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
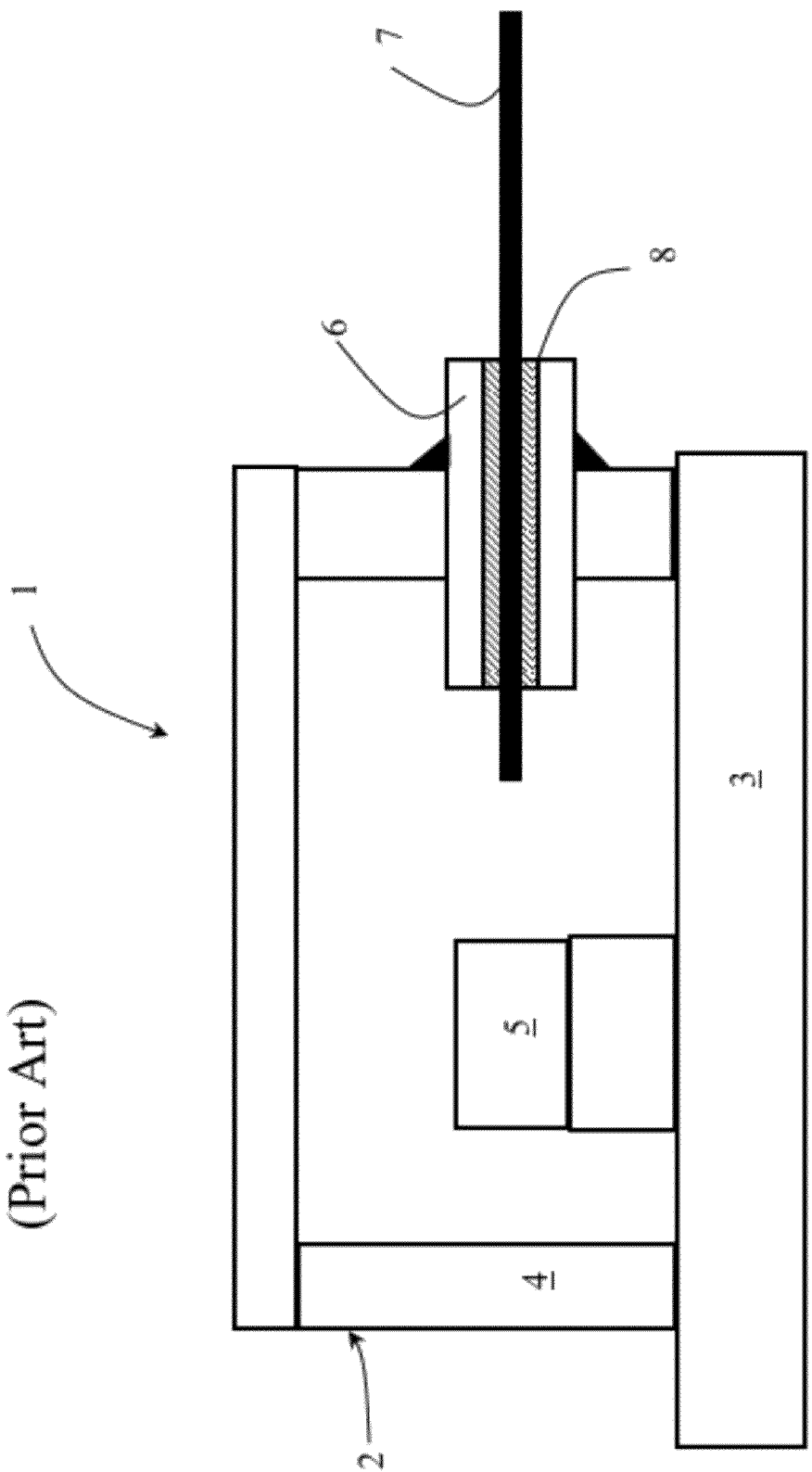
FIG. 1 is a side view of an optical module with a conventional optical fiber feedthrough.
Figure 2:
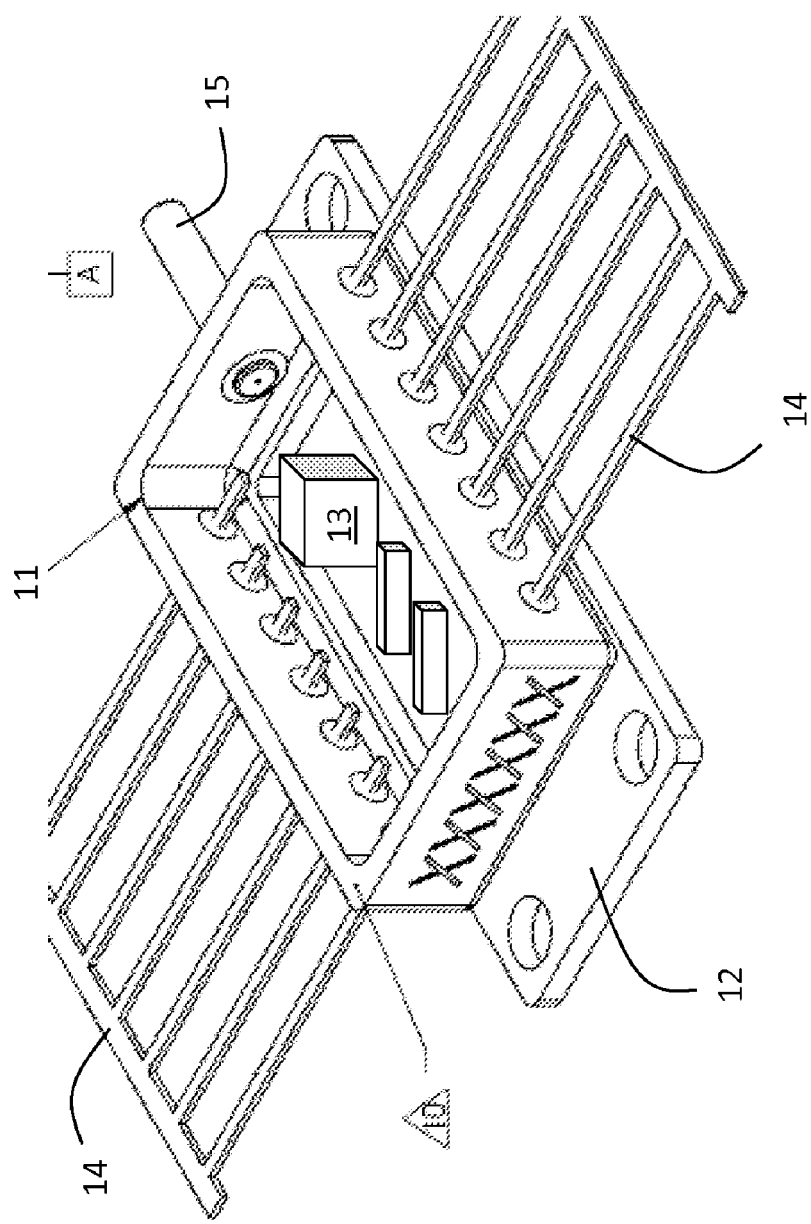
FIG. 2 is an isometric view of an optical module with an optical fiber feedthrough in accordance with the present invention.
Figure 3:
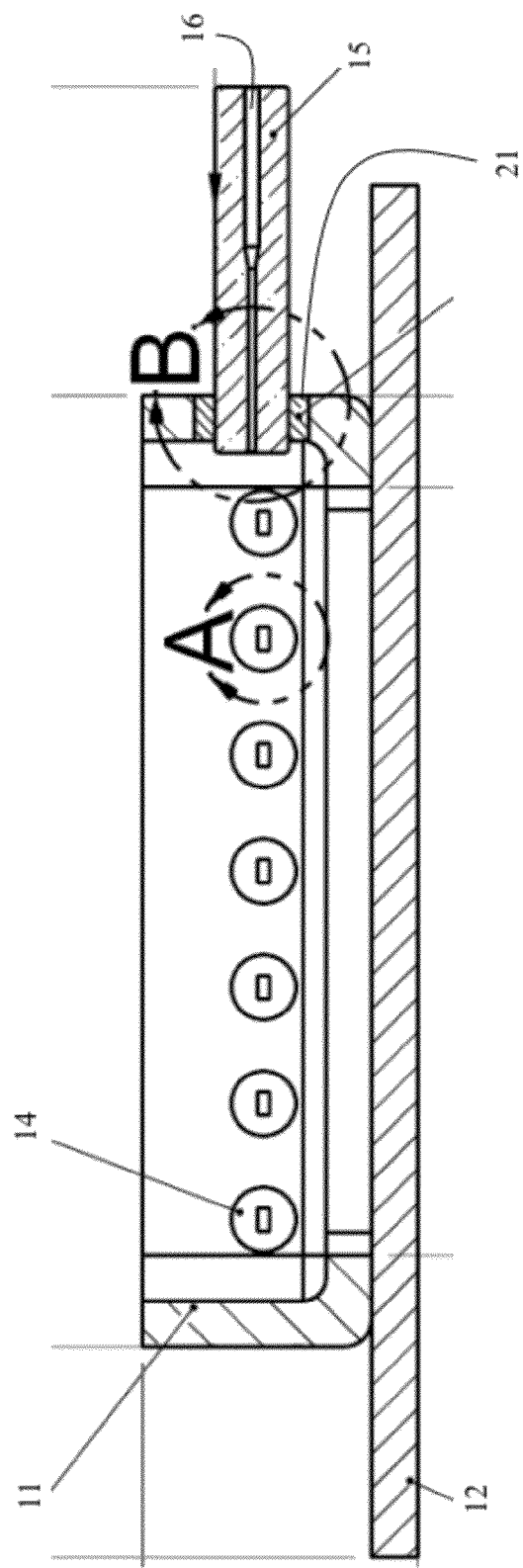
FIG. 3 is an cross-sectional view of the optical module of FIG. 2.
Figure 4:
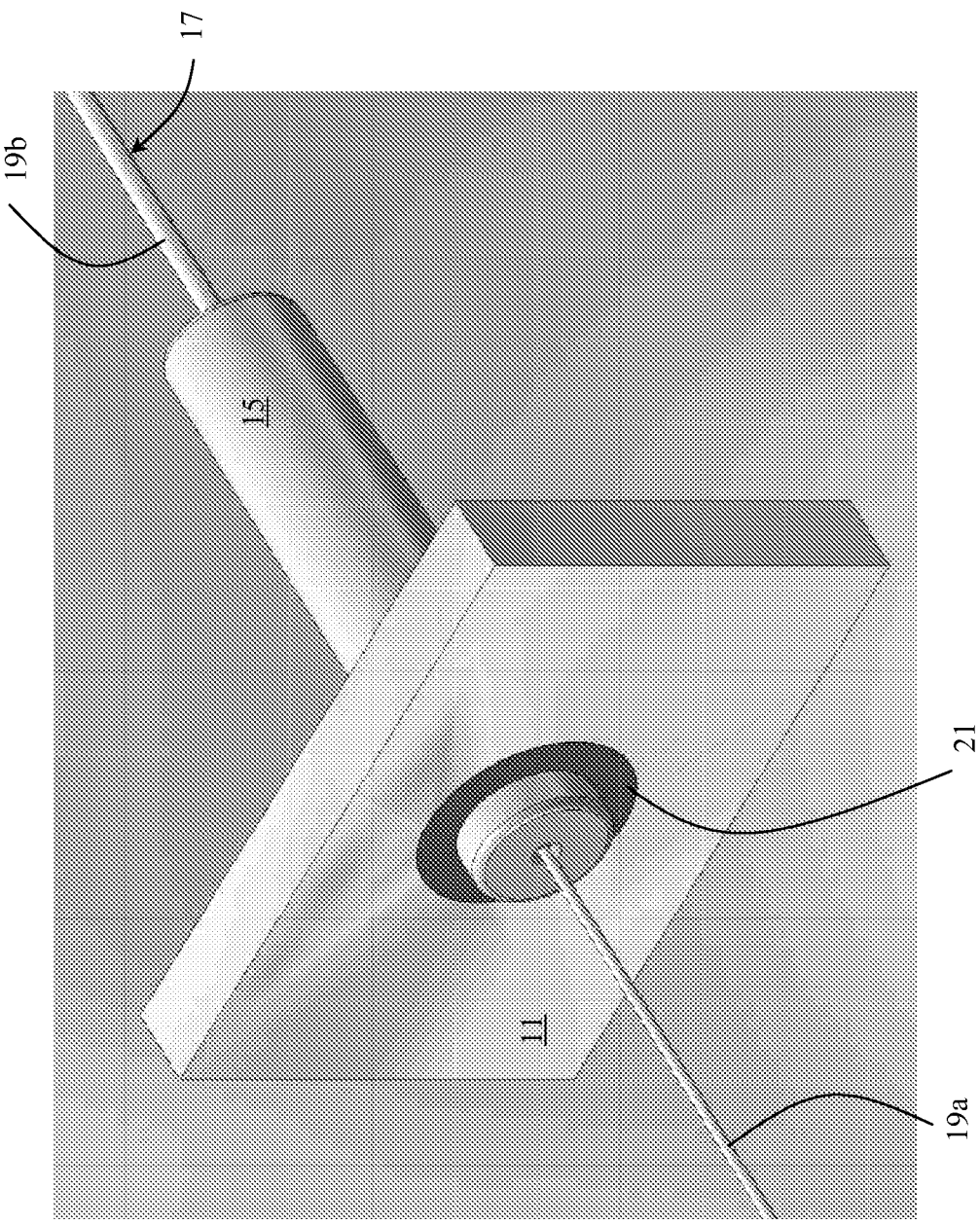
FIG. 4 is an isometric view of the optical fiber feedthrough of FIG. 2.
Figure 5:
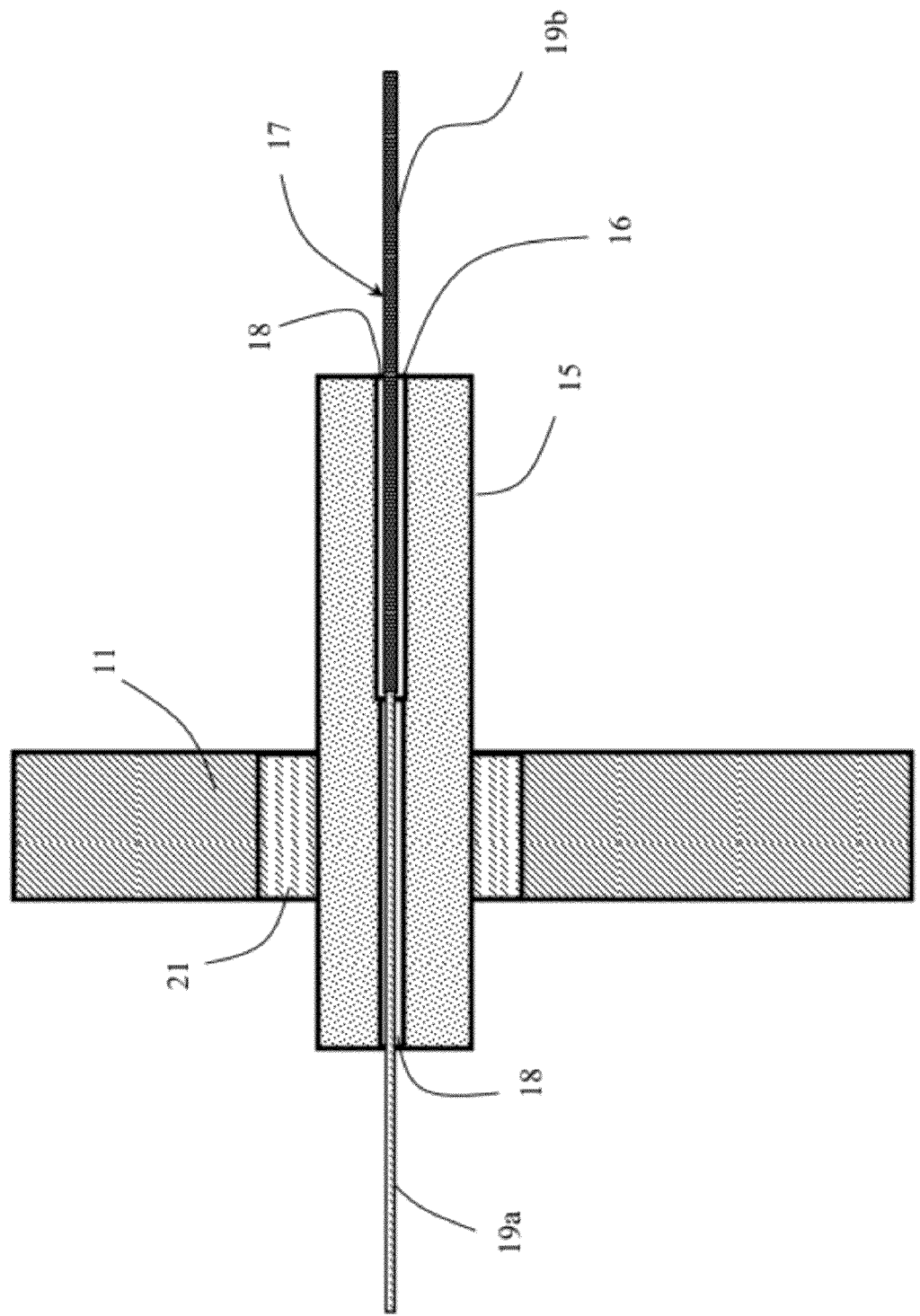
FIG. 5 is a cross-sectional view of the optical fiber feedthrough of FIGS. 2 and 3.

With reference to FIGS. 2 to 5, the optical module 10 in accordance with the present invention includes a housing 11 with a base 12 supporting optical and electro-optical components 13 e.g. a laser diode and other control and power elements. Electrical leads 14 extend outwardly from opposite sides of the housing 11 through hermetically sealed openings for transmitting electrical data signals to and from the electro-optical components 13, as well as power and control signals. A cover (not show) is also provided for sealing the components within the housing 11.

The present invention overcomes the aforementioned problems by fabricating a ceramic ferrule 15 with a bore 16 having a diameter (ID) that is only slightly larger, e.g. up to 50 µm larger, preferably between 1 µm and 35 µm larger and most preferably between 15 and 35 µm larger, than the outer diameter of the fiber 17 extending therethrough, e.g. 125 µm for a single mode fiber, by utilizing well developed advanced molding techniques, which have tolerance controls up to 1 µm accuracy over a ceramic ferrule tube length of several millimeters. Due to the high aspect ratio of the bore 16, a hermetic seal between the fiber 17 and the ferrule 15 can be formed using an adhesive 18, e.g. a low-viscosity (300 to 5000 centipoise @ 25° C.), thermally-stable (able to withstand >85° C. temperature without outgassing) epoxy adhesive, such as epoxy adhesives for fiber optic applications supplied by Loctite, Tra-Con, Epoxy Technology, etc, because the gap between the fiber 17 and bore wall is small enough to prevent cracks, but large enough to enable the epoxy adhesive 18 to wick along the fiber 17. In addition, good moldability of ceramic and glass enables the ferrule 15 to have fine features, such as sections of bore with different inner bore diameters, e.g. one section for the bare fiber 19a and one section for the jacketed fiber 19b, so that the whole fiber pigtail can be well protected in one assembly step. Such tight fit and adaptability cannot be achieved with metal tubes at low cost.

The ceramic ferrule 15 is preferably comprised of an inorganic crystalline oxide material, such as zirconium dioxide (zirconia) and aluminum oxide (alumina) or a non-crystalline material, such as silica (glass).

The fiber 17 is sealed into the ferrule 15 with a thin layer of the adhesive 18 at a low curing temperature, e.g. <130° C., much lower than higher temperature required by soldering, e.g. >175° C., or glass soldering, e.g. >350° C. Accordingly, residual stress on the fiber 17 after sealing is minimized, whereby the impacts on fiber strength and polarization are greatly reduced.

One method of sealing the ceramic or glass ferrule 15 onto the housing 11 is by metalizing the ferrule 15 and sealing with conventional metal, e.g. AgCu, brazing. However, metallization is also a costly process. Accordingly, the present invention provides a compression seal by using a material, e.g. metal, in at least a section of the housing 11 with a slightly higher coefficient of thermal expansion (CTE) than the ceramic ferrule 15 in combination with a high temperature sealing glass solder 21, disposed in an opening in the housing 11 with a diameter wider than the ferrule 15, to achieve a hermetic seal between the ferrule 15 and housing 11, at relatively low cost. Accordingly, the present invention eliminates the need for high-priced low-CTE materials, e.g. Kovar, CuW or Invar, for the housing 11 in favor of lower cost metals, e.g. high-strength (>290 MPa tensile yield strength), low-alloy (<0.20 wt % Carbon) steel, such as AISI 1018 steel or equivalent for all or at least the section of the housing 11, and AK Steel CL 2/SAE J1392 045 XLK or equivalent for the base 12.

The CTE of the ceramic ferrule 15 is approximately 0.5 to 12 ppm/° C., but ideally between 8 to 12 ppm/° C., therefore the metal for the housing 11 should have a higher CTE, e.g. 1 to 10 ppm/° C. higher, preferably 2 to 4 ppm/° C. higher, to form a compression seal with the glass solder 21 around the ferrule 15 at an operating temperature range. Accordingly, different types of metal, e.g. a CTE of between 3 to 17 ppm/° C., ideally between 10 to 17 ppm/° C., can be selected for the housing 11 or the section thereof. The gap between the ferrule 15 and the housing 11 is filled with solder glass 21 at high temperature, usually between 300° C. and 900° C. The flow temperature of the solder glass 21 has enough clearance, e.g. over 400° C., from the ceramic material phase change temperature, e.g. 1300° C. for zirconia, so that the ferrule 15 has no performance change during the sealing process. When the housing 11 cools down to the normal application conditions and operating temperatures, e.g. around room temperature, a compression stress is formed between the metal housing 11, the glass solder 21 and the ceramic ferrule 15. The compression force will ensure gaps between the ferrule 15, the housing 11 and the solder 21 are kept sealed from leakage, i.e. better than $1\times10^{-8}$ atm-cc/sec helium.

The ceramic material used for the ferrule 15 must have a large enough compression strength, e.g. greater than 200 MPa ideally greater than 500 MPa, to protect the fiber from damage, while withstanding the compression force applied by the housing 11 on the glass solder 21.

Due to the wide range of CTE's for metal housing 11, e.g. ~3 to 17 ppm/° C., and glass or ceramic ferrules 15, e.g. —0.5 to 12 ppm/° C., there are several practical combinations of materials that can produce robust, low-cost, hermetic, feedthrough assemblies, as long as the metal housing 11 has a CTE which is higher (1 to 10 ppm/C higher) than the CTE of the ceramic ferrule 15.

Figure 6:
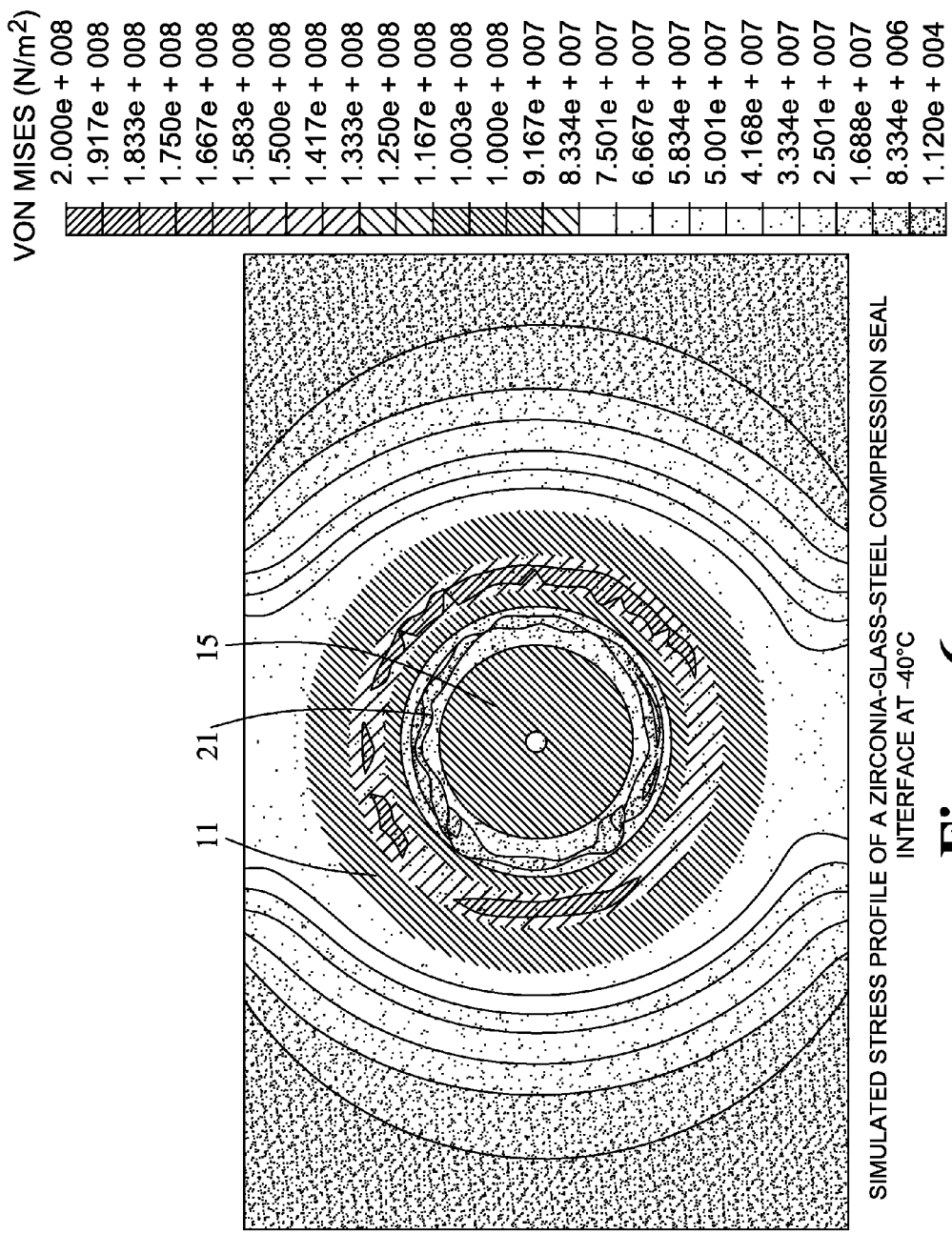
FIG. 6 illustrates a simulated stress profile of a zirconia-glass-steel compression seal at −40 C.

FIG. 6 illustrates the results of a simulation of the compression stress profile in the feedthrough of FIGS. 2 to 5 at −40° C., the lowest application temperature which the housing 11 has the highest stress level. The peak stress applied on the glass solder 21 and the ferrule 15 is <160 MPa, much lower than the compression strength of the materials, i.e. zirconia: ~2000 MPa, glass: ~260 MPa. The compression stress on the metal housing 16 is <200 MPa, much lower than compression strength the metal materials, e.g. mostly >500 MPa. Accordingly, the feedthrough will remain hermetic and mechanical bonded within application temperature conditions.

Table 1 shows experimental helium (He) leak rates for a housing 11 with an optical fiber 17 sealed in a zirconia ferrules 15 with an epoxy resin adhesive 18. The results are all well below leak rate limit of 1×10 E-8 cc.atm/s (test readings with 10% helium inside the packages).

TABLE 1

| S/N | Initial Fine leak Rate (atm · cc/sec) |
| --- | --- |
| 1 | 2.20E-10 |
| 2 | 2.80E-10 |
| 3 | 9.00E-10 |
| 4 | 2.40E-10 |
| 5 | 1.80E-10 |

Figure 7:
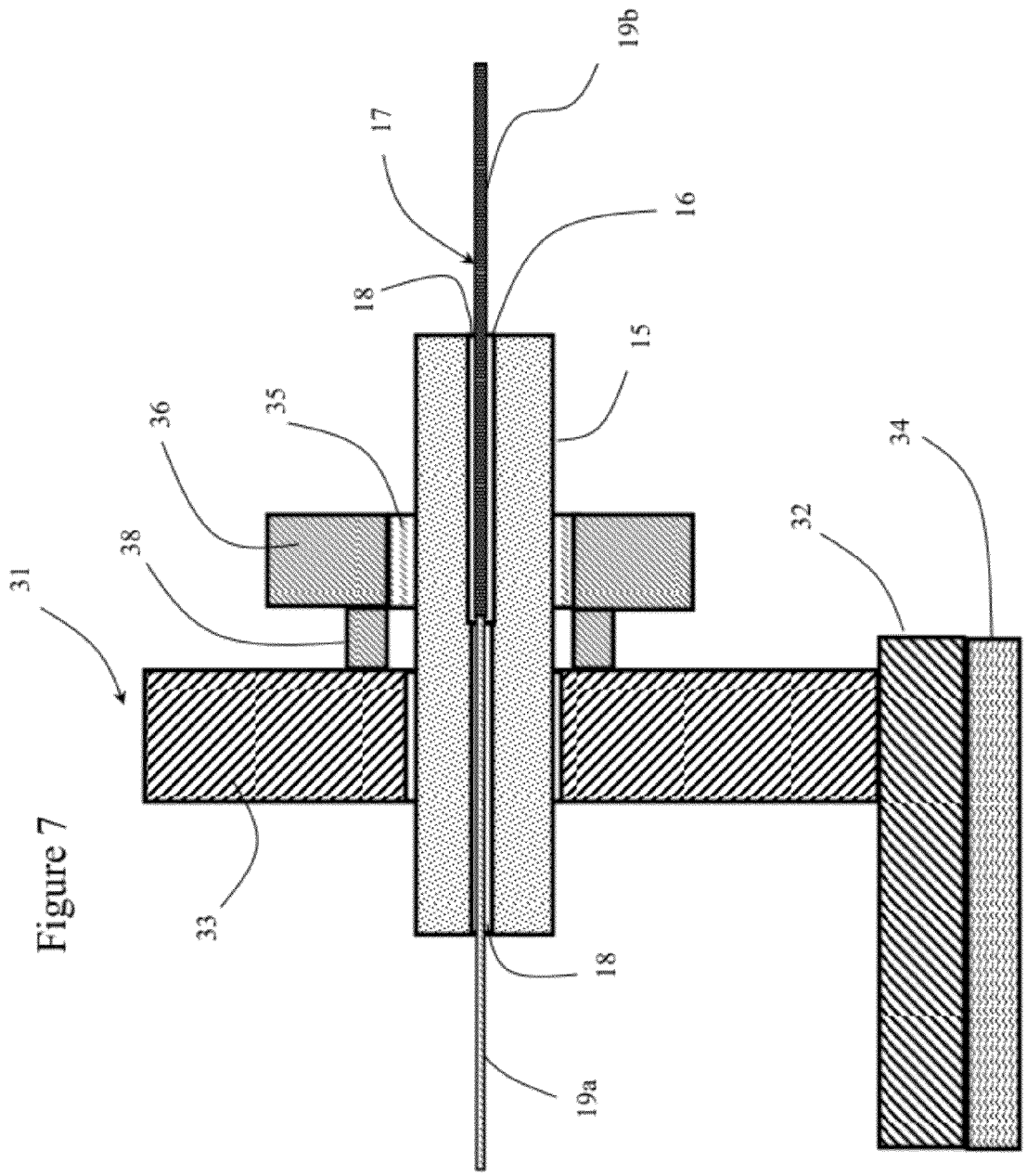
FIG. 7 is a cross-sectional view of another embodiment of the present invention.

With reference to FIG. 7, optical component, e.g. laser diode pump, module housings 31 are typically constructed with a copper tungsten (CuW) (15/85) or ceramic base 32 with a metallic, e.g. Kovar, or ceramic frame 33 mounted on the base 32 and enclosing the module components (not shown). Metallic and ceramic frames would typically have a low CTE, e.g. 3 to 10 ppm/° C. for metallic frames, and 3 to 12 ppm/° C. for ceramic frames. Typically, the CTE of the base 32 closely matches the CTE of the frame 31, e.g. <1 ppm/° C. difference, and the CTE of the base 32 is also closely matched with a TEC (thermo-electric cooler) substrate 34 that is attached to the base 32.

As defined above, the ceramic ferrule 15 with tight tolerances is also required for the housing 31 to align the lensed optical fiber 17 with the laser diode (not shown). The optical fiber 17 is hermetically sealed in the ceramic ferrule 15 with an epoxy adhesive, as described hereinbefore. Ferrules that require tight tolerances can be molded from ceramic, e.g. Zirconia, alumina or glass, material at low cost. Unfortunately, most ceramics have a higher CTE (Zirconia 9.7 ppm/° C.) compared to Kovar (7.5 ppm/° C.), typically 1 to 12 ppm/° C. higher, and hence, cannot be glass soldered directly into the frame 33. To provide a compression seal on the ferrule 15, the CTE of the frame 33 has to be greater than the CTE of the ferrule 15, e.g. the Zirconia ferrule 15 can be compression sealed into a steel frame directly because steel has a CTE of 11.7 ppm/° C., but not into a Kovar or ceramic frame. A ceramic frame 33 may have the same CTE or a greater CTE than the ceramic ferrule 15, but it is difficult to seal a ceramic ferrule to a ceramic frame with glass solder due to the difficulty in forming the hole for glass soldering in the ceramic frame.

One approach is to use glass solder 35 to attach the ceramic ferrule 15 into separate section of the housing 31 in the form of a metal, e.g. steel, sleeve 36 and then attach the steel sleeve to the frame 33, e.g. by brazing or soldering, but the large CTE mismatch (4.2 ppm/C difference for zirconia) between the metal/ceramic frame 33 and the steel sleeve 36 leads to high stresses at the glass solder/steel sleeve interface during attachment of the steel sleeve 36 to the frame 33. The high stresses lead to cracks in the glass solder 35, which result in the breaking of the hermetic seal. The high stress between the frame 33 and steel sleeve 36 also leads to warpage of the frame 33, which makes it difficult to obtain a good hermetic seal with the cover of the housing 31.

To minimize the stress between the frame 33 and the metal sleeve 36 during attachment of the sleeve 36 to the frame 33, i.e. when the temperature can increase from 20° C. up to 800° C. and back down, a stress relief bracket or spacer 38 is mounted between the frame 33 and the metal sleeve 36 spaced apart from the ferrule 15 with an airgap between the spacer 38 and the ferrule 15, i.e. the spacer 38 is not in contact with either the ferrule 15 or the glass solder 35. The stress relief bracket 38 can be the same material as the metal sleeve 36 or the frame 33 or another material with a CTE between the CTE of the metal sleeve 36 and the frame 33.

In the illustrated embodiment the stress-relief bracket 38 comprises a short (0.25 mm to 1.0 mm, ideally 0.5 mm) and thin (0.1 mm to 0.5 mm, ideally 0.2 mm) cylindrical ring that extends between the sleeve 36 and the frame 33 with no connection to the ferrule 15 or the glass solder 35, and acts as stress relief material between the CTE mismatched materials, i.e. between the frame 33 and the metal sleeve 36. Longer and thicker brackets 38 can be used to isolate the housing/bracket joint from the sleeve/ferrule joint, but cost and structural issues become a factor. The stress relief bracket 38 and the metal sleeve 36 can be made as a single monolithic structure of the same material or the stress relief bracket 38 can be an independent piece that can be attached to and in between the frame 33 and the metal sleeve 36. The stress relief bracket 38 can be attached to the frame 33 and the metal sleeve 36 by brazing or using solders, such as AuSn.

Figure 8A:
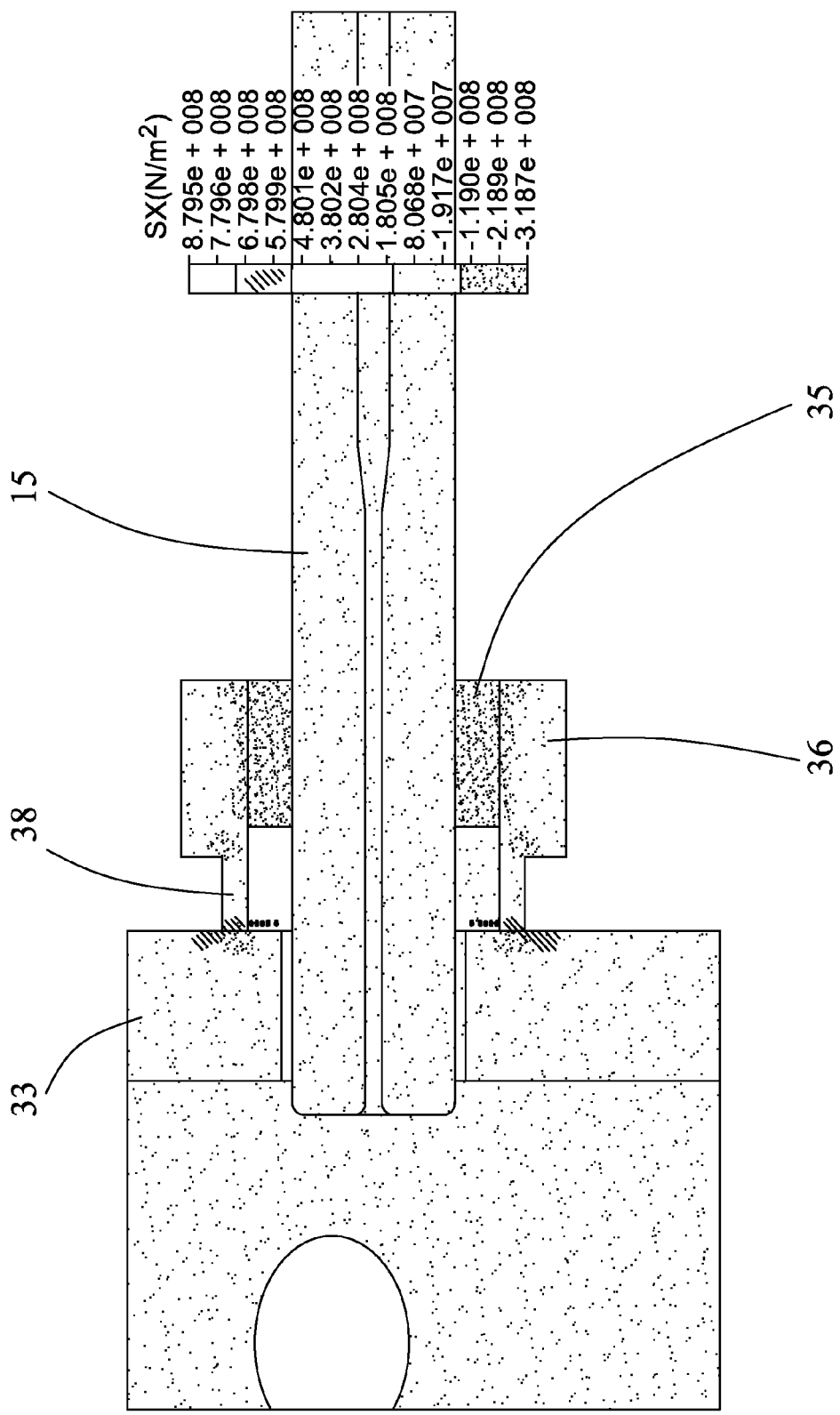
FIG. 8a illustrates a stress profile of stress between the ferrule, the steel cylinder and the stress relief bracket of the embodiment of FIG. 7.
Figure 8B:
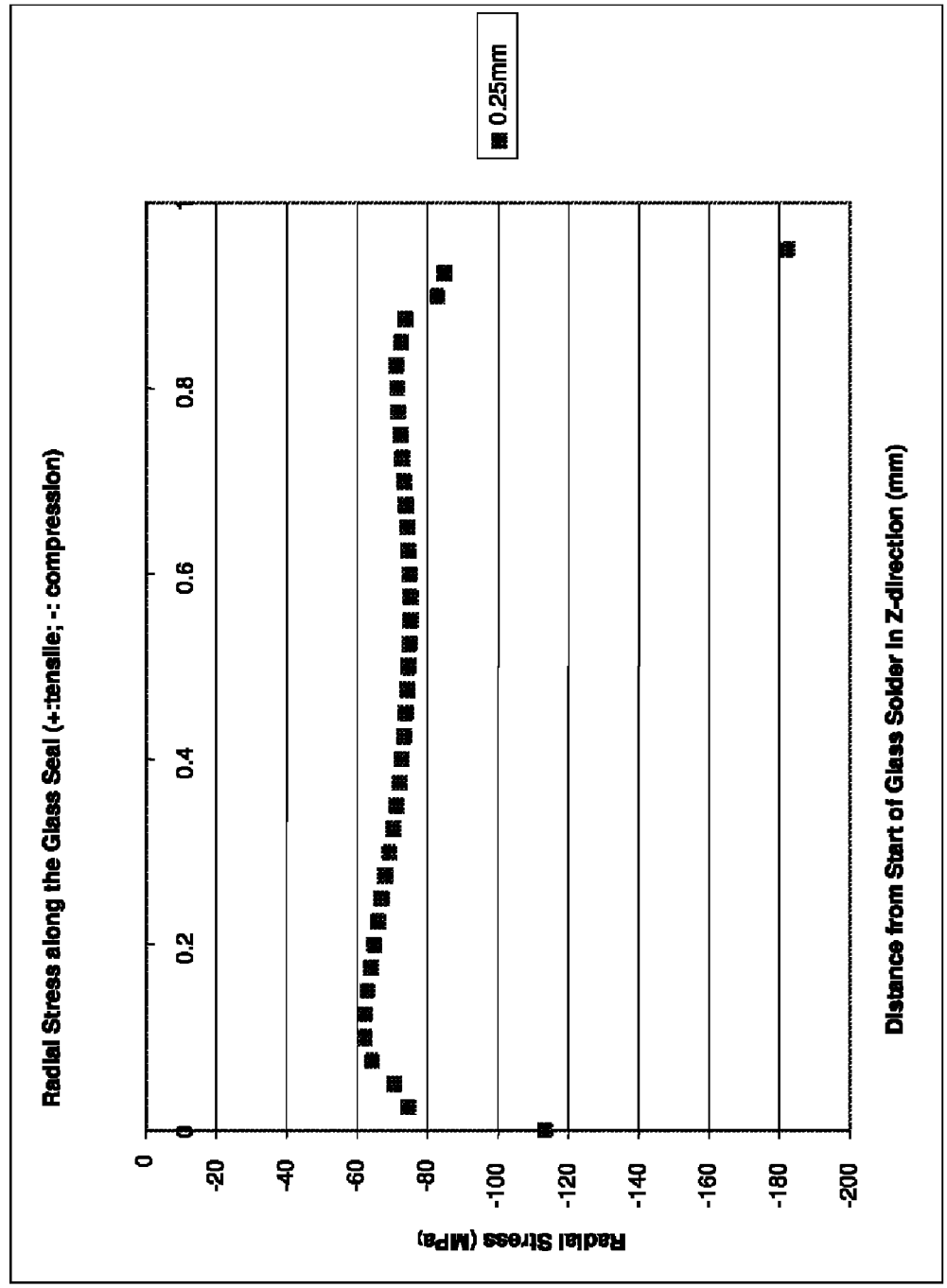
FIG. 8b is a plot of the radial stress along the glass seal.

FIGS. 8a and 8b illustrate that the stress at the sleeve 36 and the surface of the glass solder 35 is in compression (−60 MPa), for the case of a Kovar frame 33, which ensures hermeticity at the interface between the frame 33 and the glass solder 35. Without the stress relief bracket 38 the glass solder 35 cracks and hermeticity will not be maintained. Data in Table 2 illustrates that all modules with the configuration of the present invention passed the hermeticity test after assembly and post 0° C. to 100° C. thermal shock (TS) and 500 cycles −40° C. to 85° C. temperature cycling (TC).

TABLE 2

| S/N | Leak rate after Assembly | Leak rate after thermal shock | Leak rate after 220x TC | Leak rate after 550x TC |
| --- | --- | --- | --- | --- |
| A2 | 1.00E-09 | 5.00E-10 | 7.00E-10 | 9.00E-10 |
| A3 | 2.00E-09 | 1.00E-09 | 7.00E-10 | 6.00E-10 |
| A4 | 1.00E-09 | 5.00E-10 | 7.00E-10 | 5.00E-10 |
| A5 | 5.00E-10 | 9.00E-10 | 4.00E-10 | 6.00E-10 |
| A6 | 0.00E+00 | 1.00E-09 | 9.00E-10 | 5.00E-10 |
| C1 | 9.00E-10 | 1.00E-09 | 9.00E-10 | 7.00E-10 |
| C2 | 9.00E-10 | 5.00E-10 | 7.00E-10 | 9.00E-10 |
| C3 | 8.00E+10 | 5.00E-10 | 7.00E-10 | 8.00E-10 |
| C4 | 7.00E-10 | 5.00E-10 | 3.00E-10 | 1.00E-09 |
| C5 | 9.00E-10 | 2.00E-09 | 7.00E-10 | 7.00E-10 |

Figure 9:
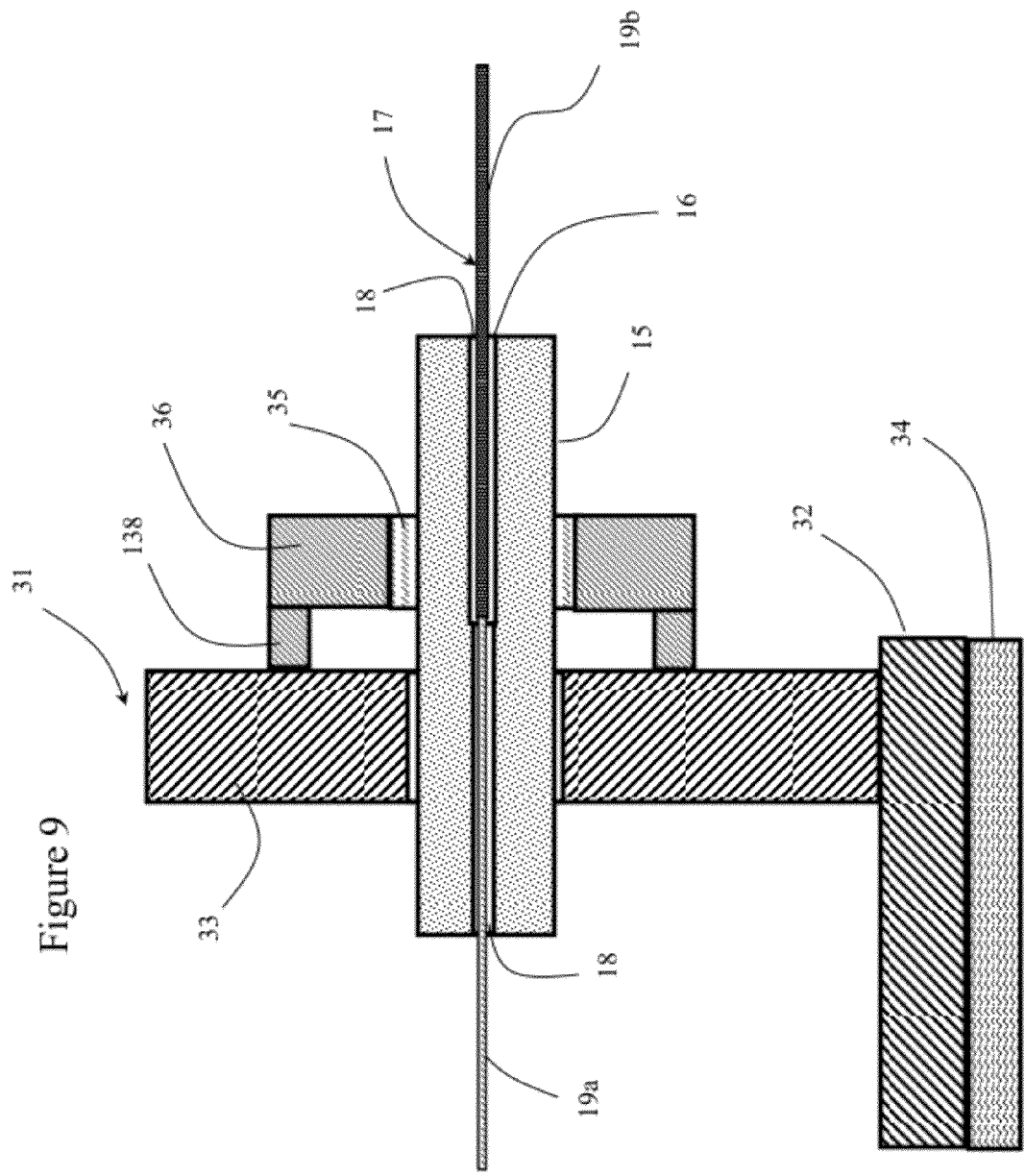
FIG. 9 is a cross-sectional view of another embodiment of the present invention.

FIG. 9 illustrates another embodiment identical to the embodiment of FIG. 7, except that the stress-relief bracket, now stress-relief bracket 138, is positioned at the outermost diameter of the steel sleeve 36. The outer ring embodiment of FIG. 9 further isolates the housing/bracket joint from the sleeve/ferrule joint to reduce stress therebetween, but the manufacture of a one-piece sleeve/bracket 36/138 with two internal radii can be more costly than the one-piece sleeve/bracket 36/38 with one internal radius and two external radii.

We claim:

1. An optical module comprising:
   an optical component for generating optical signals;
   a housing for enclosing the optical component, the housing having a section with a first coefficient of thermal expansion (CTE) and including an opening extending through an outer wall thereof;
   a ceramic ferrule, extending through the opening in the section of the housing with a gap therebetween, having a second CTE less than the first CTE, and including a longitudinally extending passage with an inside diameter (ID);
   a glass solder, filling the gap between the ferrule and the section of the housing, and being under compression by the section of the housing due to the difference in the first and second CTE forming a hermetic seal therebetween;
   an optical fiber, extending through the ferrule into alignment with the optical component, having an outside diameter up to 50 μm less than the inside diameter of the longitudinally extending passage; and
   an adhesive hermetically sealing the optical fiber in the longitudinally extending passage.

2. The optical module according to claim 1, wherein the housing includes:
   a main frame for enclosing the optical component;
   a mounting sleeve, defining the section of the housing with the first CTE, for receiving the ceramic ferrule through the opening therein, which defines the gap therebetween; and
   a stress-relief bracket extending between the mounting sleeve and the main frame without direct connection to the ferrule or the glass solder.

3. The optical module according to claim 1, wherein the first CTE is 1 to 10 ppm/° C. greater than the second CTE.

4. The optical module according to claim 1, wherein the adhesive comprises an epoxy resin adhesive.

5. The optical module according to claim 1, wherein the first CTE is between 3 to 17 ppm/° C.

6. The optical module according to claim 1, wherein the first CTE is between 10 ppm/° C. and 17 ppm/° C.

7. The optical module according to claim 1, wherein the section of the housing is comprised of a high strength, low-alloy steel.

8. The optical module according to claim 1, wherein the second CTE is between 8 to 12 ppm/° C.

9. The optical module according to claim 1, wherein the second CTE is between 0.5 to 10 ppm/° C.

10. The optical module according to claim 1, wherein the ferrule is comprised of a material selected from the group consisting of zirconia, alumina, and glass.

11. A method of forming a feedthrough in a optical module including a housing with a section having a first coefficient of thermal expansion (CTE), comprising:
   a) providing a ceramic ferrule having a longitudinally extending passage with an inside diameter (ID), the ceramic ferrule having a second CTE less than the first CTE;
   b) hermetically sealing an optical fiber extending through the ferrule with an adhesive, the optical fiber having an outside diameter (OD) up to 50 μm less than the ID of the ferrule;
   c) extending the ferrule through an opening in the section of the housing with a gap therebetween; and
   d) melting a glass solder at an elevated temperature in the gap to secure the ferrule in the opening;
   whereby at operating temperatures the section of the housing compresses the glass solder forming a hermetic seal, due to the difference in the first and second CTEs;
   wherein step b) comprises hermetically sealing the optical fiber into the ferrule with a thin layer of an epoxy resin adhesive at a curing temperature of less than 130° C.

12. The method according to claim 11, wherein the section of the housing includes a mounting sleeve, which includes the opening for receiving the ceramic ferrule; and
   wherein the housing also includes:
   a main frame for enclosing an optical component separate from the mounting sleeve; and
   a stress-relief bracket extending between the mounting sleeve and the main frame without direct connection to the ferrule or the glass solder.

13. The method according to claim 11, wherein step d) comprises filling the gap between the ferrule and the housing with solder glass at a temperature between 300° C. and 900° C.

14. The method according to claim 11, wherein the first CTE is 1 to 10 ppm/° C. greater than the second CTE.

15. The method according to claim 11, wherein the section of the housing is comprised of a high strength, low-alloy steel.

16. The method according to claim 11, wherein the second CTE is between 8 to 12 ppm/° C.

17. The method according to claim 11, wherein the ferrule is comprised of a material selected from the group consisting of zirconia, alumina, and glass.

18. A method of forming a feedthrough in a optical module including a housing with a section having a first coefficient of thermal expansion (CTE), comprising:
   a) providing a ceramic ferrule having a longitudinally extending passage with an inside diameter (ID), the ceramic ferrule having a second CTE less than the first CTE;
   b) hermetically sealing an optical fiber extending through the ferrule with an adhesive, the optical fiber having an outside diameter (OD) up to 50 μm less than the ID of the ferrule;
   c) extending the ferrule through an opening in the section of the housing with a gap therebetween; and
   d) melting a glass solder at an elevated temperature in the gap to secure the ferrule in the opening;

whereby at operating temperatures the section of the housing compresses the glass solder forming a hermetic seal, due to the difference in the first and second CTEs;

wherein the first CTE is between 10 ppm/° C. and 17 ppm/° C.

19. The method according to claim 18, wherein step b) comprises hermetically sealing the optical fiber into the ferrule with a thin layer of an epoxy resin adhesive at a curing temperature of less than 130° C.

20. An optical module comprising:

an optical component for generating optical signals;

a housing for enclosing the optical component, and including an opening extending through an outer wall thereof;

a ceramic ferrule, extending through the opening in the housing, having a first CTE and including a longitudinally extending passage with an inside diameter (ID);

a mounting sleeve for receiving the ceramic ferrule through an opening therein with a gap therebetween, having a second CTE greater than the first CTE;

a glass solder filling the gap between the ferrule and the mounting sleeve under compression by the mounting sleeve due to the difference in the first and second CTE forming a hermetic seal therebetween;

a stress-relief bracket extending between the mounting sleeve and the housing without direct connection to the ferrule;

an optical fiber, extending through the ferrule into alignment with the optical component, having an outside diameter up to 50 μm less than the inside diameter of the longitudinally extending passage; and an adhesive hermetically sealing the optical fiber in the longitudinally extending passage.

21. The optical module according to claim 20, wherein the second CTE is 1 to 10 ppm/° C. greater than the first CTE.

22. The optical module according to claim 20, wherein the mounting sleeve and the stress-relief bracket consist of a monolithic structure.

23. The optical module according to claim 20, wherein the stress-relief bracket has a CTE the same as the housing or between the CTE of the housing and the second CTE.

24. The optical module according to claim 20, wherein the housing is comprised of a metal with a CTE of between 3 and 10 ppm/° C.

25. The optical module according to claim 20, wherein the housing is comprised of a ceramic material with a CTE of between 3 and 12 ppm/° C.

26. The optical module according to claim 20, wherein the housing has a CTE, which is less than the first CTE by between 1 and 12 ppm/° C.

* * * * *